US006863289B2

United States Patent
Buhl et al.

(10) Patent No.: US 6,863,289 B2
(45) Date of Patent: Mar. 8, 2005

(54) AXLE LOCATING ROD

(75) Inventors: Reinhard Buhl, Bohmte (DE); Uwe Cossmann, Tecklenburg (DE); Sören Knopp, Ostercappeln (DE); André Diener, Osnabruck (DE); Reinhard Richter, Bohmte (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 99 days.

(21) Appl. No.: 10/333,239

(22) PCT Filed: May 16, 2002

(86) PCT No.: PCT/DE02/01781

§ 371 (c)(1),
(2), (4) Date: Jan. 15, 2003

(87) PCT Pub. No.: WO02/094592

PCT Pub. Date: Nov. 28, 2002

(65) Prior Publication Data

US 2004/0012167 A1 Jan. 22, 2004

(30) Foreign Application Priority Data

May 18, 2001 (DE) ........................................ 101 18 623

(51) Int. Cl.[7] ................................................ B60G 9/00
(52) U.S. Cl. .......................... 280/124.111; 280/124.116
(58) Field of Search ..................... 280/124.11, 124.111, 280/124.116, 124.117, 124.156; 180/352; 403/76, 122, 150, 151, 157

(56) References Cited

U.S. PATENT DOCUMENTS

| 2,180,860 | A | * | 11/1939 | Brown ..................... 267/64.23 |
| 2,635,895 | A |   | 4/1953 | Wahlberg |
| 4,415,179 | A | * | 11/1983 | Marinelli ............. 280/124.116 |
| 4,565,390 | A |   | 1/1986 | Merkle |
| 5,366,035 | A | * | 11/1994 | Hayashida et al. ...... 180/24.01 |
| 5,458,359 | A | * | 10/1995 | Brandt ................. 280/124.111 |
| 5,549,320 | A |   | 8/1996 | Ellingsen |
| 5,649,719 | A |   | 7/1997 | Wallace et al. |
| 6,231,264 | B1 |  | 5/2001 | McLaughlin et al. |
| 6,270,282 | B1 |  | 8/2001 | McLaughlin et al. |
| 2003/0160416 | A1 | * | 8/2003 | Leen ................... 280/124.116 |

FOREIGN PATENT DOCUMENTS

| DE | 37 18 533 C1 | 5/1988 |
| DE | 92 18 307.7 | 1/1994 |
| DE | 43 38 651 A1 | 3/1995 |
| DE | 196 34 215 A1 | 2/1998 |
| GB | 873877 | 8/1961 |
| JP | 06286442 | 10/1994 |
| WO | WO 96/22896 | 8/1996 |
| WO | WO 99/36279 | 7/1999 |

* cited by examiner

Primary Examiner—David R. Dunn
(74) Attorney, Agent, or Firm—McGlew and Tuttle, P.C.

(57) ABSTRACT

An axle rocker for connecting an axle 3 to the vehicle body 2 of a motor vehicle, which has a flange 9 provided at the axle 3, a central joint arranged at the flange 9 and two swivel arms 4 and 8 connected to the central joint, which are pivotably fastened to the vehicle body 2. The central joint has a central joint housing 10 and a central joint inner part 11, which is mounted pivotable in same and which protrudes from the central joint housing 10 at its two ends designed as connection pins on two mutually opposite sides. Furthermore, at least part of the central joint housing 10 is made in one piece with the flange 9, and the swivel arms 4 and 8 are fastened with their ends facing the central joint to the two connection pins of the central joint inner part 11.

26 Claims, 5 Drawing Sheets

AXLE LOCATING ROD

FIELD OF THE INVENTION

The present invention pertains to an axle rocker for linking an axle to the vehicle body of a motor vehicle.

BACKGROUND OF THE INVENTION

Axle rockers have been known from the state of the art and are also called, among other things, transversal swinging arms for guiding a motor vehicle axle.

DE 37 18 533 C1 discloses a steering triangle comprising two axle struts for guiding truck rear axles, which can be articulated to one another at two mounting points at the vehicle body, on the one hand, and, on the other hand, are mounted at a ball-and-socket joint at the axle body, wherein the opening angle between the axle struts is adjustable and the ball-and-socket joint has a multipart joint housing and a joint ball inserted into it rotatably. The axle struts protrude into a mount provided in the joint ball, and a bolt, which extends through the mount at right angles to the axle struts and at which the axle struts are mounted with a hole, is inserted into the joint ball. The housing has a flange, with which it can be mounted on the axle body.

Tolerance problems may develop because of the large number of parts, and, furthermore, the assembly of this steering triangle is especially complicated. Due to the size of the opening in the joint housing, the joint can be sealed against dirt and moisture with a considerable effort only. The two axle struts are also not at the same level, so that undesired bending moments may develop.

DE 92 18 307 U1 discloses a central joint of a steering triangle for connecting the said steering triangle to an axle in the chassis of a motor vehicle. The central joint comprises a housing designed or is made in one piece, at which the control arms are arranged, and a joint inner part, which is rigidly connected to the axle body of the vehicle and which is arranged in the housing in a molecularly deformable joint body. The joint inner part is designed as a ball piece with two fastening pins, which, located opposite each other, are led out of the housing and whose common longitudinal axis is arranged horizontally in parallel to the vehicle axis. On the side facing away from the central joint, the control arms are fastened to the vehicle body via a strut joint in articulated manner. In summary, this steering triangle has the feature that the axle-side joint is integrated in the transversal swinging arm.

Since different motor vehicles also differ in terms of their body and are also subject to different loads depending on their fields of use, it is necessary to develop, manufacture and install an individually adapted axle rocker for each of these motor vehicles. The different axle rockers differ, e.g., in the different design of the joints, in the length or the diameter of the control arms or in the angles formed by the control arms. Furthermore, the control arms may be connected to the joint housing by a screw connection or to each other according to a hot pressing method or a friction welding method. One-part cast constructions made of iron or aluminum are also possible.

However, such a manufacture, stocking and installation of different axle rockers adapted to the special model of vehicle is very complicated and expensive, because a large number of variants must always be kept available for the market.

SUMMARY OF THE INVENTION

Based on this state of the art, the basic object of the present invention is to provide an axle rocker for connecting an axle to the vehicle body of a motor vehicle, by means of which the effort and the costs for the manufacture and the installation can be reduced, especially with respect to the large number of different vehicle models.

According to the invention, an axle rocker is provided for connecting an axle to the vehicle body of a motor vehicle, with a flange provided on the axle, with a central joint. The central joint is arranged at the flange and has a central joint housing and a central joint inner part, which is mounted pivotably therein and which protrudes from the central joint housing at its two ends. The ends are designed as connection pins on two mutually opposite sides. Two swivel arms are connected to the central joint and are pivotably fastened to the vehicle body. At least part of the central joint housing is made in one piece with the flange. The swivel arms are fastened with their ends facing the central joint to the flange. The swivel arms are fastened with their ends facing the central joint to the two connection pins of the central joint inner part.

The axle rocker according to the present invention for connecting an axle to the vehicle body of a motor vehicle has the flange provided on the axle or on the axle body. The central joint is arranged on or in the flange, and the two swivel arms are connected to the central joint, which are pivotably fastened to the vehicle body. The central joint has a central joint housing and the central joint inner part mounted pivotably in same. The inner part protrudes from the joint housing with its two ends designed as connection pins on two mutually opposite sides. Furthermore, at least part of the housing is made in one piece with the flange, and the swivel arms with their ends facing the central joint are fastened to the two connection pins of the central joint inner part.

The swivel arms in the axle rocker according to the present invention are fastened to the central joint inner part rather than to the central joint housing, so that the central joint housing forms a component of the axle rocker that is separated from the swivel arms. Different central joints can thus be combined with different swivel arms in a simple manner. This is especially advantageous when even though different swivel arms must be used for different motor vehicles, the central joint has an identical design. One and the same central joint, which is simply combined with the swivel arms adapted to the particular vehicle model, can thus be used for different vehicle models. Different central joints and different swivel arms can thus be made available by the manufacturer in the manner of a modular system and combined in an adapted manner depending on the vehicle model. The effort and the costs for the manufacture of axle rockers are considerably reduced by such a modular system.

Furthermore, the central joint of the axle rocker according to the present invention can be arranged closer to the axle of the motor vehicle than the central joint housing of a conventional axle rocker, which is made in one piece with the swivel arms, because the central joint housing must have a minimum distance from the flange or from the axle, which minimum distance makes possible the movement of the central joint housing relative to the central joint inner part. However, this is not necessary in the axle rocker according to the present invention, because what is rigidly connected to the swivel arms is the central joint inner part rather than the central joint housing. Installation space can be saved as a result.

The central joint housing is also made at least partly in one piece with the flange, so that no separate fastening means is necessary for fastening the central joint housing to the flange. This reduces the assembly effort.

The connection between the central joint inner part and the swivel arms may be established as a detachable or nondetachable connection by frictional engagement (e.g., conical connection, annular spring clamping elements, force fit), by a positive-locking connection (e.g., calotte connection, radial serration) or by connection in substance (e.g., welding). However, the central joint inner part is preferably connected to the swivel arms by screw connection. This detachable connection makes possible the later replacement of individual components of the axle rocker according to the present invention in a simple manner.

The flange and the central joint housing made at least partially in one piece therewith may, e.g., be welded to each other. However, the flange and the central joint housing made at least partially in one piece therewith preferably form a single casting. Ductile crystalline materials, e.g., iron materials (especially steel) or aluminum alloys (as lightweight construction materials) may be used as materials for the flange and the central joint housing. Furthermore, constructions made from fiber composites or from aluminum and/or steel plates extrusion-coated with glass fiber-reinforced plastic (GFP) in a sandwich arrangement are possible.

The flange may be a component separated from the axle, which is fastened to the axle body, e.g., by means of a screw connection or by a welded connection. However, the flange is preferably integrated within the axle body. This can be achieved, e.g., by the flange according to the present invention and the axle body forming a single casting.

The central joint housing may have a multipart design, in which case the different central joint housing parts must be assembled during the assembly of the axle rocker. However, the central joint housing preferably has a one-part design, as a result of which the assembly effort is reduced.

The central joint may be designed as a simple drag and slide bearing in order to ensure the function of the axle rocker according to the present invention. However, the central joint is preferably designed as a ball-and-socket joint, in which case the central joint inner part has a ball piece mounted in the central joint housing between the two connection pins. Compared with a drag and slide bearing, the ball-and-socket joint has more degrees of freedom, so that the axle has a greater freedom of movement relative to the vehicle body and the central joint is stressed less during the travel of the motor vehicle. The term "ball" (in the terms "ball-and-socket joint" and "ball piece") should not be interpreted in the strict mathematical sense here. The term "ball" is rather defined here as an outwardly directed, at least partially circular bulge relative to the central joint inner part, which is formed on the central joint inner part between the connection pins. The bulge may be provided, e.g., with a partial spherical surface in the mathematical sense. However, the bulge preferably has a partially flattened partial ball surface.

The central joint may be designed as a simple slide bearing. However, the central joint is preferably designed as a rubber bearing or molecular bearing, wherein an elastomer body is arranged between the central joint housing and the central joint inner part. It is possible by means of a central joint of such a design to affect the damping characteristic of the central joint such that some mechanical vibrations are absorbed at least partially in the elastomer body. The intensity of some shocks of the central joint housing in relation to the central joint inner part can also be reduced by the elastomer body.

The two swivel arms of the axle rocker according to the present invention may be connected to each other exclusively via the central joint inner part and the vehicle body. However, the swivel arms are additionally rigidly connected to one another via a connection piece at their end areas facing the central joint. The connection piece increases the rigidity of the axle rocker according to the present invention and thus affects the strength and the dynamic behavior of the axle rocker.

The connection piece may be made in one piece with the swivel arms or its material may be homogeneous with that of the swivel arms. However, it is also possible to design the connection piece as a one-part or multipart sheet metal piece, which is welded to the swivel arms after the assembly of the axle rocker. However, the connection piece may also be fastened detachably to the swivel arms, e.g., by means of screws.

The swivel arms of the axle rocker according to the present invention may form a straight connection between the vehicle body and the central joint. However, the swivel arms are preferably bent at their end areas facing the central joint, in which case the two swivel arms extend essentially in parallel to one another in the area between the bends and the central joint inner part. The dynamic behavior of the axle rocker can be varied by changing the site at which the bends are provided in the swivel arms, by changing the distance between the areas of the two swivel arms, which said areas extend essentially in parallel, and/or by changing the distance between the two ends of the two swivel arms, which said ends face the vehicle body. In particular, the spring deflection and the rolling properties of the motor vehicle can be affected.

If the two swivel arms are located over a large area on the two equal sides of an isosceles triangle, e.g., the distance between the center of the central joint and the intersection of the two sides of the isosceles triangle is an important variable for the dynamic behavior of the axle rocker according to the present invention. The center of the central joint may be located on the bisecting line of this isosceles triangle, in front of or behind the intersection of the two sides of the isosceles triangle in order to thus adjust the dynamic behavior of the axle rocker to the particular requirements.

Each of the two swivel arms of the axle rocker according to the present invention may be fastened to the vehicle body via a separate drag bearing. The connection between the particular swivel arm and the associated drag bearing housing may be established, e.g., by means of a screw connection. However, each swivel arm is preferably made with its end facing the vehicle body in one piece with the drag bearing housing, in which a drag bearing inner part fastened to the vehicle body is pivotably mounted. As a result, the assembly of the axle rocker according to the present invention is simplified, because only the drag bearing inner parts must be fastened to the vehicle body in order to link the swivel arms to the vehicle body. This one-piece connection of the drag bearing housing to the swivel arm may be performed, e.g., by hot pressing or friction welding. The two swivel arms may also be designed as a one-piece casting construction with the drag bearing housings. The suitable materials are ductile crystalline materials, e.g., iron materials (especially steel) or aluminum alloys (as lightweight construction materials). Furthermore, constructions made of fiber composites or from aluminum and/or steel plates extrusion-coated with glass fiber-reinforced plastic (GFP) in a sandwich arrangement are possible as well.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
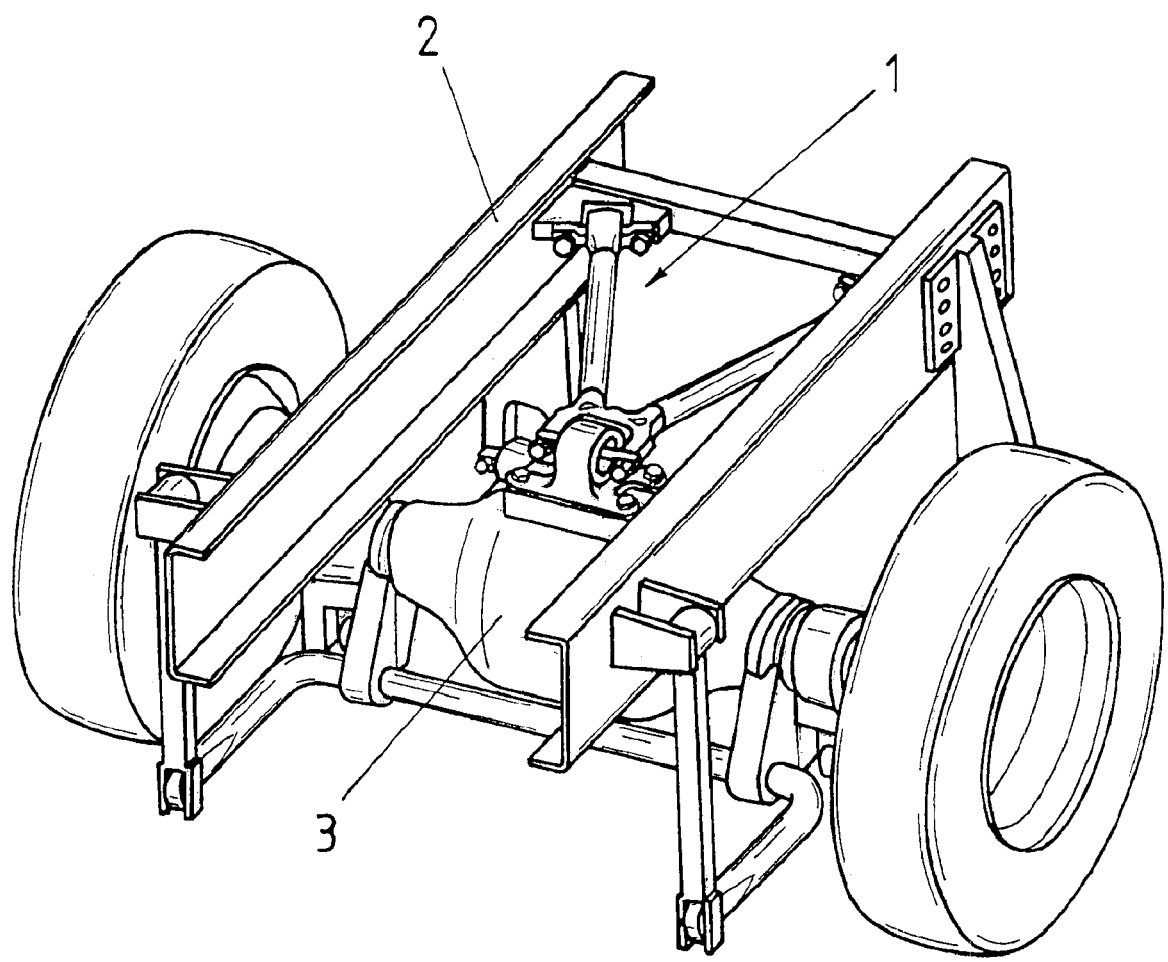
FIG. 1 is a perspective view of a first embodiment of the axle rocker according to the present invention in the installed state.

Referring to the drawings in particular, FIG. 1 shows a perspective view of a first embodiment of the axle rocker 1 according to the present invention in the installed state. The axle rocker 1 is connected to both the vehicle body 2 and the axle 3 such that the axle 3 is guided pivotably in relation to the vehicle body 2.

Figure 2:
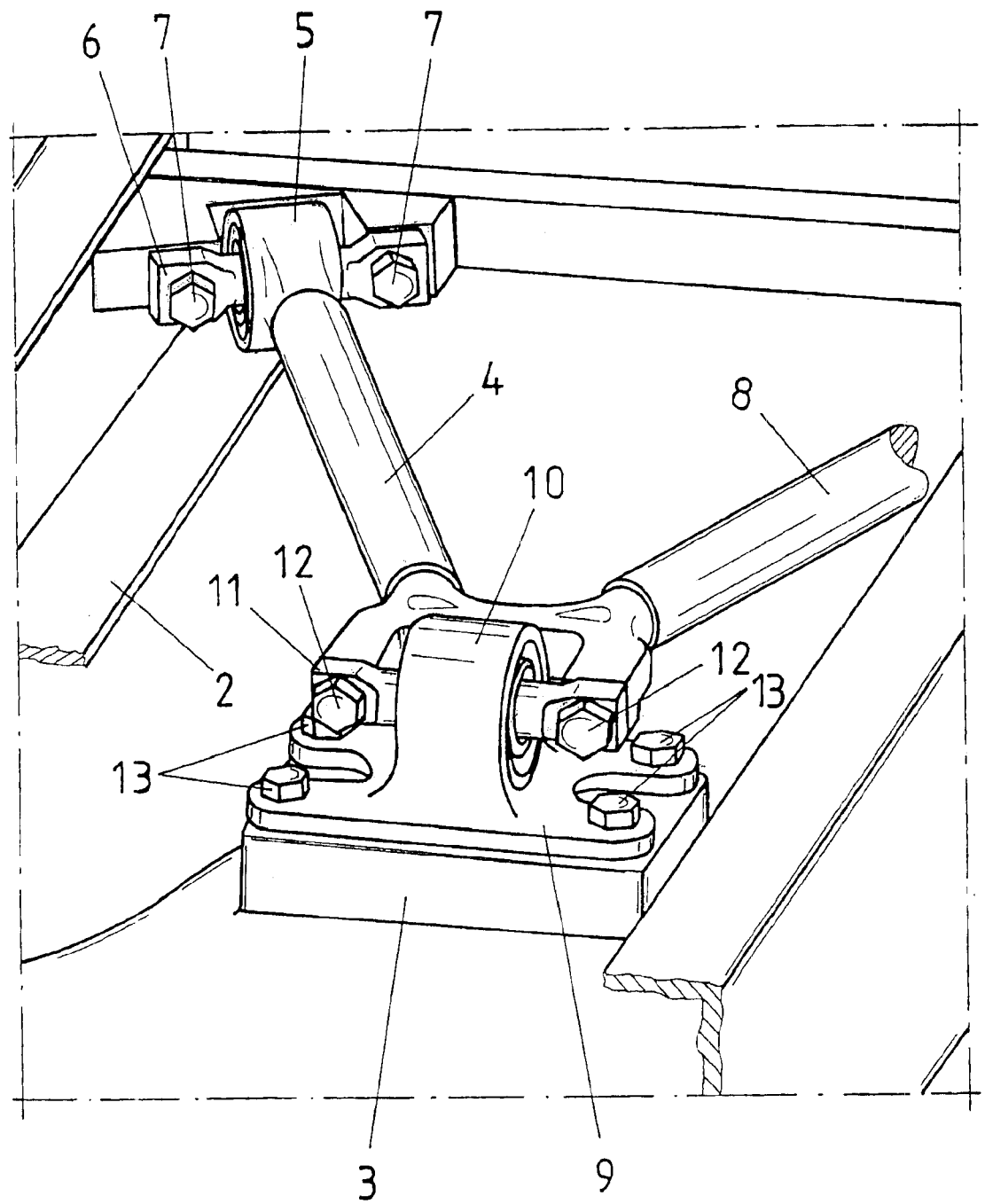
FIG. 2 is an enlarged view of the axle rocker according to FIG. 1.

FIG. 2 shows an enlarged view of the axle rocker 1 according to the first embodiment. The axle rocker 1 has a first swivel arm 4, which is connected to the vehicle body 2 via a first drag bearing. The first drag bearing has a first drag bearing housing 5, which is made in one piece with the first swivel arm 4 and in which a first drag bearing inner part 6 is mounted pivotably. The first drag bearing inner part 6 is fastened to the vehicle body 2 by means of screws 7. The second swivel arm 8 is fastened to the vehicle body 2 in the same manner as the first swivel arm 4 but at another point.

The two swivel arms 4 and 8 are connected with their ends facing away from the vehicle body 2 to the axle 3 of the motor vehicle via a central joint and a flange 9 provided thereon. The central joint has a one-part central joint housing 10, which is made in one piece with the flange 9 and in which a central joint inner part 11, which protrudes with both of its ends designed as connection pins from the central joint housing 10 on two mutually opposite sides, is pivotably mounted. The central joint inner part 11 is rigidly connected to both swivel arms 4 and 8 by means of screws. Furthermore, the flange 9 is rigidly connected to the axle 3 of the motor vehicle by means of screws 13.

As is apparent from FIGS. 1 and 2, the two swivel arms 4 and 8 extend over a large area along the two equal sides of an isosceles triangle, and the central joint is arranged on the bisecting line of the angle formed by the two swivel arms 4 and 8. This axle rocker 1 can therefore also called a steering triangle for guiding the motor vehicle axle 3.

Figure 3:
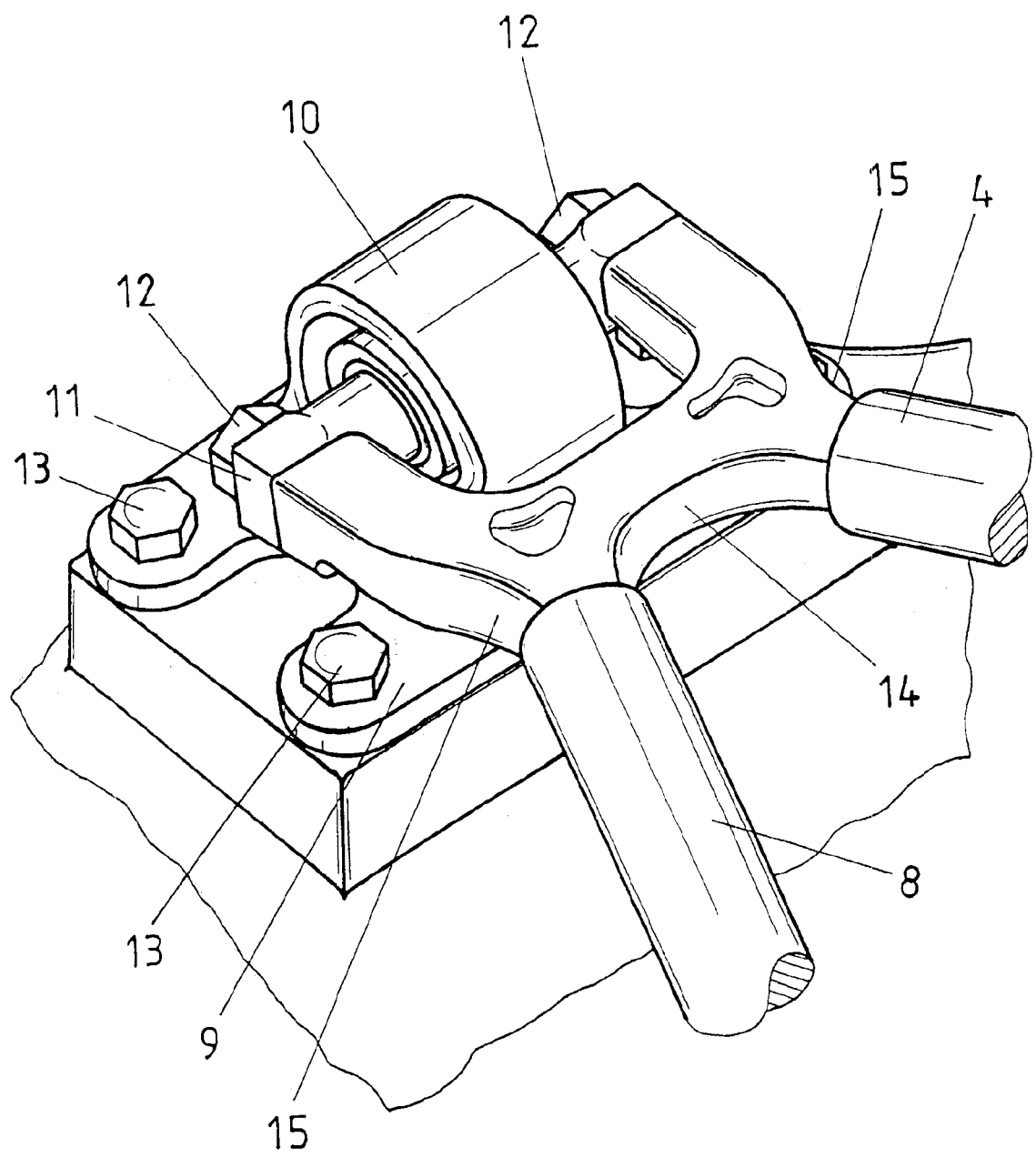
FIG. 3 is a detail of a connection of the axle rocker according to FIG. 1 to the motor vehicle axle.

FIG. 3 shows an enlarged view of the axle connection of the axle rocker 1 according to the first embodiment. To increase the rigidity of the axle rocker 1, the two swivel arms 4 and 8 are rigidly connected to each other in their end areas facing the central joint via a connection piece 14. Furthermore, a bend 15 is provided in each of the swivel arms 4 and 8 in the area of the connection piece 14, and the swivel arms 4 and 8 extend essentially in parallel to the bisecting line of the isosceles triangle between the bends 15 and the central joint inner part 11.

Figure 4:
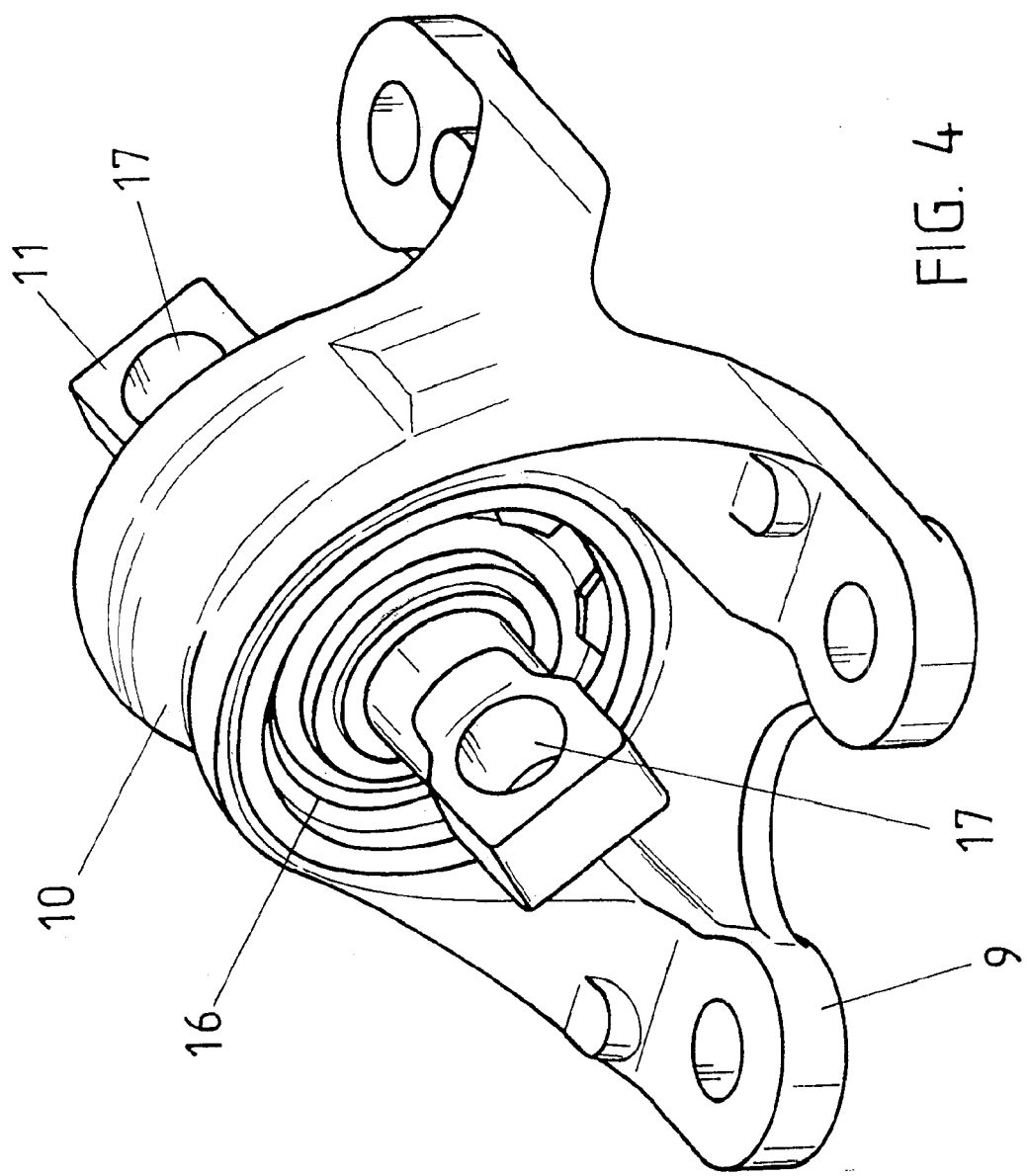
FIG. 4 is an isolated view of the central joint of the axle rocker according to FIG. 1.

FIG. 4 shows the central joint used according to the first embodiment. The central joint is designed as a rubber joint or molecular joint, and an elastomer body 16 made of rubber is provided between the central joint housing 10 and the central joint inner part 11. The elastomer body 16 affects the vibration behavior of the central joint such that various disturbing vibrations are absorbed for the most part by the elastomer body. A shock of the central joint housing 10 in relation to the central joint inner part 11 is also transmitted to the central joint inner part 11 via the elastomer body 16 in a weakened form. This reduces the loads transmitted from the axle to the vehicle body and increases the driving comfort.

As is apparent from the figure, holes 17, through which the screws 12 for fastening the two swivel arms 4 and 8 to the central joint inner part 11 in the assembled state of the axle rocker 1 extend, are provided in both connection pins of the central joint inner part 11.

Furthermore, a ball piece, which is located in the central joint housing 10 and forms a ball-and-socket joint in cooperation with the elastomer body 16 and the central joint housing 10, is formed at the central joint inner part 11 according to the first embodiment between its two connection pins.

Figure 5:
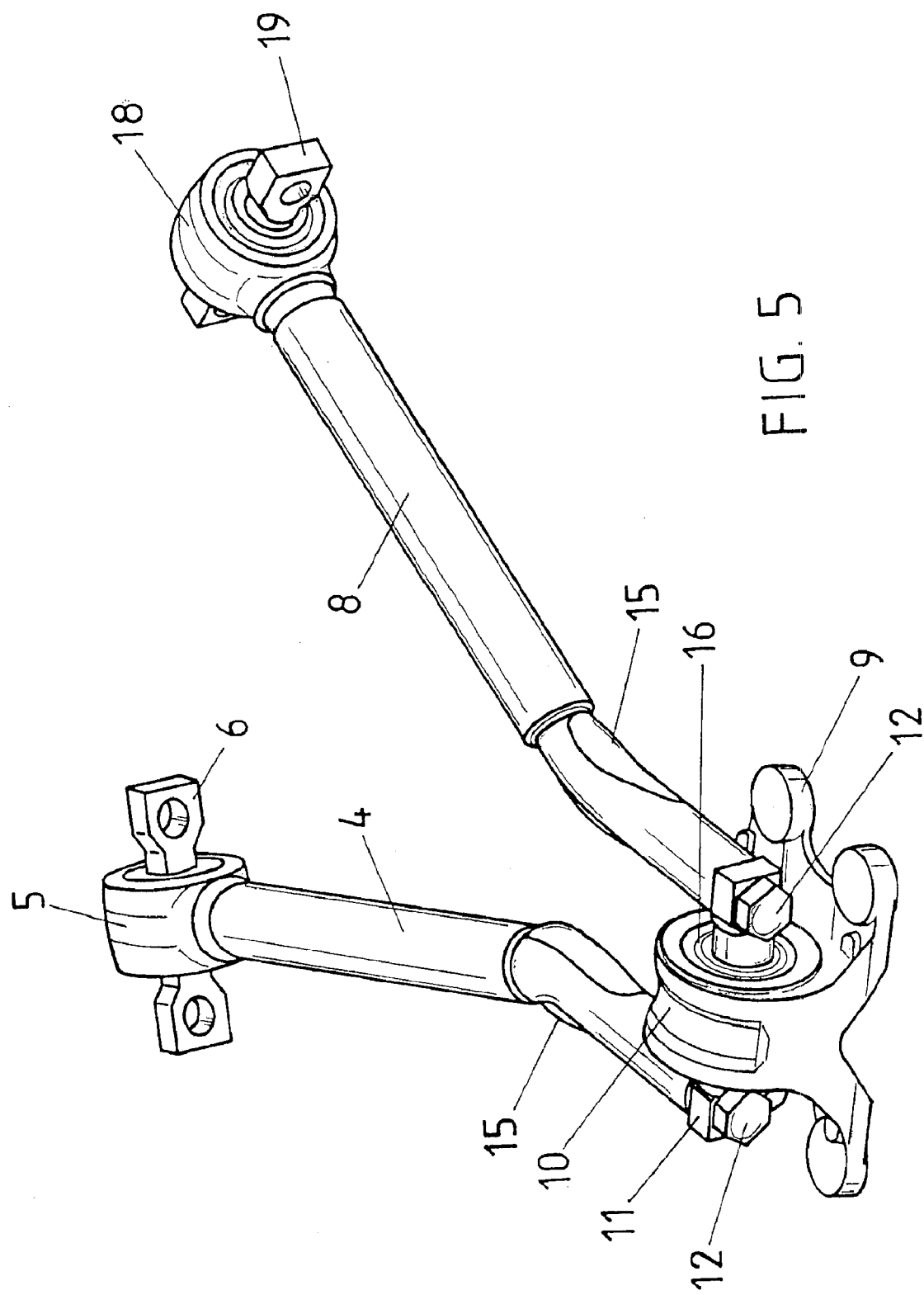
FIG. 5 is a perspective view of a second embodiment of the axle rocker according to the present invention.

FIG. 5 shows a perspective view of a second embodiment of the axle rocker according to the present invention in the non-assembled state. A first swivel arm 4 is made in one piece with a first drag bearing housing 5, in which a first drag bearing inner part 6 is mounted pivotably, via which the first swivel arm 4 can be fastened to the vehicle body of the motor vehicle. Furthermore, a second swivel arm 8 is made in one piece with a second drag bearing housing 18, in which a second drag bearing inner part 19 is mounted pivotably, via which the second swivel arm can be fastened to the vehicle body. The two swivel arms 4 and 8 are fastened with their ends facing away from the drag bearing housings 5 and 18 to a central joint inner part 11, which is mounted pivotably in a central joint housing 10, which is made in one piece with a flange 9 and can be fastened to the axle of the motor vehicle. Furthermore, an elastomer body 16 is provided between the central joint inner part 11 and the central joint housing 10, so that a rubber joint or molecular joint is formed from the central joint. The central joint is designed as a ball-and-socket joint according to the second embodiment as well, and the central joint inner part 11 has a ball piece, which is arranged in the central joint housing 10 and is provided between the two ends of the central joint inner part 11, which ends are designed as connection pins. The connection pins protrude from the joint housing 10 on two mutually opposite sides and are rigidly connected to the swivel arms 4 and 8 by screws 12.

As is apparent from FIG. 5, a bend 15 is provided in both swivel arms 4 and 8, and the swivel arms 4 and 8 extend essentially in parallel to each other between the bend 15 and the central joint inner part 11.

No connection piece is provided for connecting the two swivel arms 4 and 8 according to the second embodiment. However, such a connection piece may nevertheless be provided on the swivel arms 4 and 8 after the assembly of the axle rocker by welding a plate or two plates located opposite each other to both swivel arms 4 and 8 in the area of the bend 15.

According to the preferred embodiments, the screws 12 are screwed through the connection pins on the front side into the swivel arms 4 and 8. However, it is also possible to screw the screws 12 into the swivel arms 4 and 8 from the top (in parallel to the front surface of the swivel arms) through the connection pins.

While specific embodiments of the invention have been shown and described in detail to illustrate the application of the principles of the invention, it will be understood that the invention may be embodied otherwise without departing from such principles.

What is claimed is:

1. An axle rocker for connecting an axle to a vehicle body of a motor vehicle, the axle rocker comprising:
   a flange provided on the axle;
   a central joint arranged at said flange, said central joint having a central joint housing with at least part of said central joint housing made in one piece with said flange and a central joint inner part mounted pivotably in said central joint housing, said central joint inner part protruding from said central joint housing at two ends having connection pins on two mutually opposite sides; and
   two swivel arms formed separately from said central joint inner part with each end of said swivel arms adjacent to said central joint fastened to a respective one of said two connection pins of said central joint inner part and with further ends of said swivel arms adjacent to the vehicle body pivotably fastened to the vehicle body.

2. An axle rocker in accordance with claim 1, wherein said flange is integrated with the axle body.

3. An axle rocker in accordance with claim 1, wherein said central joint housing has a one-part design.

4. An axle rocker in accordance with claim 1, wherein said central joint inner part has a ball piece mounted in said joint housing between said two connection pins.

5. An axle rocker in accordance with claim 1, wherein an elastomer body is arranged between said central joint housing and said central joint inner part.

6. An axle rocker in accordance with claim 1, wherein said swivel arms are rigidly connected to one another via a connection piece at end areas of said swivel arms facing said central joint.

7. An axle rocker in accordance with claim 1, wherein said swivel arms have a bend in end areas facing said central joint.

8. An axle rocker in accordance with claim 1, wherein each of said swivel arms is connected with an end facing the vehicle body in one piece to a drag bearing housing, and a drag bearing inner part fastened to the vehicle body is mounted pivotably.

9. An axle vehicle body connection, comprising:
   a motor vehicle axle body;
   a vehicle body part of a motor vehicle;
   a flange provided on said axle body;
   a central joint arranged at said flange, said central joint having a central joint housing with at least part of said central joint housing made in one piece with said flange and a separate formed central joint inner-part mounted pivotably in said central joint housing, said central joint inner part protruding from said central joint housing at two ends comprising a first side connection pin on a mutually opposite side from a second side connection pin; and
   swivel arms formed separately from said first side connection pin and said second side connection pin, said swivel arms having swivel arm ends adjacent to said central joint with a first side swivel arm end connected to said first side connection pin and a second side swivel arm end connected to said second side connection pin and additional ends pivotably fastened to said vehicle body part.

10. An axle vehicle body connection in accordance with claim 9, wherein said central joint inner part has a ball piece mounted in said joint housing between said two connection pins.

11. An axle vehicle body connection in accordance with claim 9, wherein an elastomer body is arranged between said central joint housing and said central joint inner part.

12. An axle vehicle body connection in accordance with claim 9, wherein each of said swivel arms is connected with an end facing said vehicle body part in one piece to a drag bearing housing, and a drag bearing inner part fastened to said vehicle body part is mounted pivotably.

13. An axle vehicle body connection according to claim 9, wherein each of said swivel arms is fastened to said vehicle body via a separate drag bearing.

14. An axle vehicle body connection according to claim 13, wherein said central joint housing has a one-part design.

15. An axle vehicle body connection, comprising:
   a motor vehicle axle body;
   a vehicle body part of a motor vehicle;
   a flange provided on said axle body;
   a central joint arranged at said flange, said central joint having a central joint housing with at least part of said central joint housing made in one piece with said flange and a central joint inner part mounted pivotably in said central joint housing, said central joint inner part protruding from said central joint housing at two ends having connection pins on two mutually opposite sides; and
   two swivel arms each having a bend area facing said central joint inner part and a swivel arm portion extending from said bend area to a connection to a respective one of said two connection pins wherein said swivel arm portions extend substantially in parallel to each other;
   a first drag bearing fastened to the vehicle, a first body side swivel arm end being fastened to said first drag bearing; and
   a second drag bearing fastened to the vehicle, a second body side swivel arm end being fastened to said second drag bearing, said bend areas being spaced apart by a distance that is less than the distance between said first and second drag bearings.

16. An axle vehicle body according to claim 15, wherein each of said swivel arms is rigidly connected to one another by a connection piece at end area of each said swivel arm facing said central joint and bends are provided in the area of said connection piece.

17. An axle vehicle body according to claim 16, wherein each of said connection pieces is directly connected to each of said swivel arms.

18. An axle vehicle body according to claim 16, wherein said connection piece is integrally formed with each of said swivel arms.

19. An axle vehicle body according to claim 16, wherein the material of said connection piece is homogeneous with the material of said swivel arms.

20. An axle vehicle body according to claim 16, wherein each of said swivel arms extends substantially parallel to each other in the area between said connection piece and said central joint inner part.

21. An axle vehicle body according to claim 16, wherein each of said swivel arms is located on the two equal sides of an isoscelees triangle in the area between the bends and said drag bearings.

22. An axle vehicle body according to claim 16, wherein said central joint inner part is formed separately from each of said swivel arms.

23. An axle vehicle body according to claim 16, wherein said central joint housing is an integral one part design.

24. An axle vehicle body according to claim 16, wherein said joint housing is arranged between parallel sections of said swivel arms.

25. An axle vehicle body according to claim 16, wherein said connection pins are rigidly connected to each of said swivel arms by a screw.

26. An axle vehicle body according to claim 25 wherein each of said screws is screwed through said connection pins on the front side into said swivel arms.

* * * * *